United States Patent Office 2,783,009
Patented Feb. 26, 1957

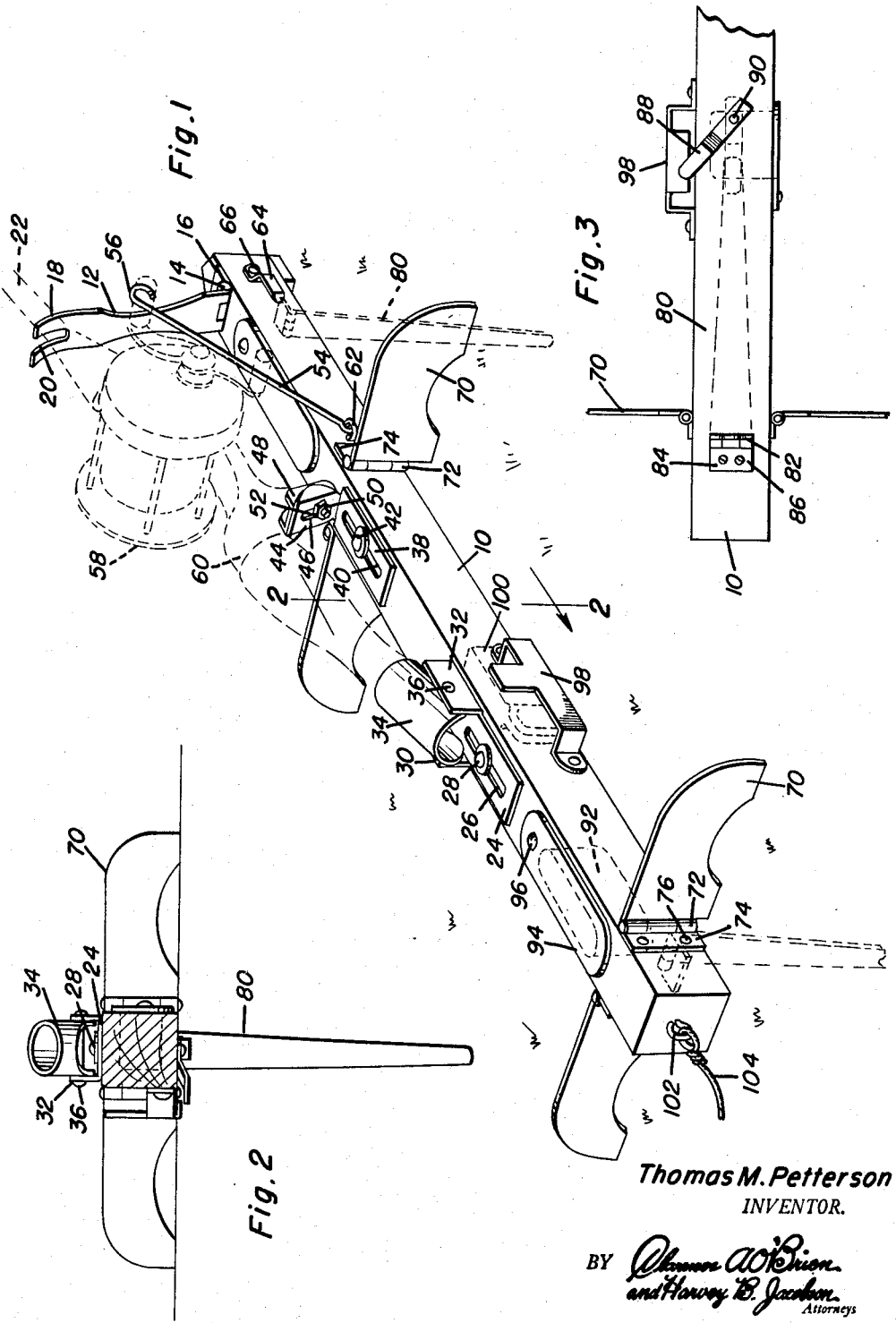
Feb. 26, 1957   T. M. PETTERSON   2,783,009
ROD HOLDER
Filed May 12, 1954
Thomas M. Petterson
INVENTOR.

2,783,009

ROD HOLDER

Thomas M. Petterson, Rising Star, Tex.

Application May 12, 1954, Serial No. 429,171

3 Claims. (Cl. 248—44)

This invention relates to a rod holder and particularly to a device for retaining a fish rod in operative position.

When fishing with rod and reel it is frequently desirable to be able to position the rod and reel in a holder so that the angler may operate a plurality of rods or may sit at ease while the fish are not biting.

In the construction according to the present invention a rod supporting construction has an elongated body member on which are mounted a plurality of appendages so that the various positions may be secured with ease. Adjacent the front end of the body is provided a bifurcated support member for holding the rod proper while a socket is adjustably mounted on the body for retaining the rear end of the handle and various mechanisms such as laterally extending wings may be used to prevent upsetting of the body so that the device may be set on a hard surface such as the seat or bottom of a boat without being upset. Further, the device may be provided with anchors so that the entire structure may be set in the sand or soil of a beach and readily retained in operative relation. The device may be provided with suitable pockets for retaining suitable pieces of equipment which will then always be at hand when the device is handy.

It is accordingly an object of the invention to provide an improved rod holder.

It is a further object of the invention to provide a rod holder in which the various portions will fold into contact with the body of the device.

It is a further object of the invention to provide a rod holder which will not be upset in use.

It is a further object of the invention to provide a rod holder in which a rod may be adjustably mounted and substantially unattended.

Other objects and many of the attendant advantages of the present invention will be apparent from the following detailed description taken in conjunction with the accompanying drawing, in which:

Figure 1 is a perspective view of the rod holder according to the invention;

Figure 2 is a cross-section through the rod holder taken substantially on the plane indicated by the section line 2—2 of Figure 1;

Figure 3 is a fragmentary bottom plan view of a portion of the rod holder.

In the exemplary embodiment according to the invention a rod holder comprises a portable elongated body 10 preferably of substantially rectangular cross section and constructed of suitable light material such as wood. The folding rod support or arm 12 is provided with a hinge 14 the leaf 16 of which is secured to the top of the outer end of said body by any suitable means, such as screws. The free swingable end 18 of the rod support 12 is provided with a bifurcation or slot 20 for receiving the fishing rod 22 preferably immediately adjacent the junction of said rod with the handle portion.

A first bracket 24 is mounted on the top of the body 10 intermediate the ends thereof and preferably in spaced relation to the upstanding rod support 12 and this bracket is provided with a longitudinal slot 26 through which extends a screw 28 for adjustably mounting the bracket for longitudinal movement and adjustment toward and away from the support 12. Bracket 24 is provided with upstanding spaced parallel flanges 30 and 32 between which is mounted a rod handle engaging socket member 34 by means of suitable pivot fasteners such as the pins 36.

A second bracket 38 is mounted on the top of the body 10 intermediate the bracket 24 and the support 12 and this bracket 38 is likewise provided with a longitudinally extending slot 40 through which extends the screw 42 for adjustably mounting the bracket 38 for longitudinal adjustment on the top of the body 10. The bracket 38 is provided with an upstanding end portion 44 preferably channel-shaped in cross-section and being provided with a longitudinally extending slot 46. An adjustable channel-shaped stop engaging member or receiver 48 is mounted in the channel-shaped end 44 and is provided with a fastener such as the bolt 50 which extends through the slot 46 and is secured by any suitable means such as the nut 52.

A reel lock 54 is preferably constructed of suitable material such as wire and has an eye 56 for engagement with the handle of a reel 58 mounted on the handle 60 of the rod 22. The lock member 54 is pivotally mounted on the side of the body 10 by means of a suitable fastener such as the eye 62. A resilient clip 64 is mounted on the side of the body 10 by any suitable member such as a screw 66 and is so positioned that the eye 56 may be clasped under the same to retain the reel lock in an out-of-the-way position while the over-all device is being carried.

A plurality of wing-like stabilizers or feet 70 are provided at their inner ends with hinges 72 and mounting portions 74 which are secured to the vertical side of the body 10 by any suitable means such as screws 76. The feet members 70 are suitably paired, are arranged and spaced longitudinally and are movable into and out of closing relation with the side of the body 10 so that they may be either extended at right angles to roll preventing positions or folded against the side of the body.

In order to properly anchor the device on the banks of streams and the like suitable anchors or stakes 80 are provided with hinge members 82 and mounting members 84 which are secured to the body 10 by any suitable means such as screws 86. A resilient clasp 88 is mounted on the body 10 in proximity to the location of the free end of each anchor 80 and will be swiveled about a suitable fastener such as the screw 90 so that it may be swung into and out of engaging relation with the end of the anchor 80 to maintain the same in firm location against the bottom side of the body 10.

Suitable pockets or recesses 92 may be placed in the body 10 at various points where they do not interfere with the attachment and operation of the various features of the device, these pockets may be used to carry sinkers, hooks or other paraphernalia which may be used while fishing and preferably covers 94 are secured by means of suitable pivot screws 96 and are swingable into and out of closing relation with the pockets 92. Obviously the recesses or pockets 92 may be of any size or shape and may be placed at any convenient position on either the sides or top of the body 10 so that the covers 94 will not interfere with the operation of any portion of the device.

Spring brackets 98 may be attached to the side of the body 10 at various points so that various tools such as the combination scale and measuring stick 100 may be readily mounted thereon and maintained in position for immediate use.

To place the device in carrying position, the various complements such as the arm 12, the roll checking and stabilizing wings 70 and the anchors 80 will be folded against the body and secured by the various clips or by the tension of the hinge pins. Also the device such as the reel lock will be secured under its retaining clip so that the entire device is substantially a straight relatively small body which may be readily carried by means of an eye 102 and a securing line 104. When the device is to be used for fishing from a relatively hard surface the roll checking wings are extended in lateral directions from the body 10 and the support 12 is adjusted to its vertical position and the rod 22 is placed in the crotch 20 and the handle secured in the socket 34 with the thumb stop secured in the channel 48 and, after the line has been properly tightened, the reel will be prevented from rotating by means of the reel lock 54. If there is any danger of the device being pulled away by a fish on the line, the line 104 may be made fast to any suitable fixed object (not shown) so that there will be no danger of the fish pulling the rod holder into the water.

When the device is to be utilized on the bank or on other material where such action is possible the anchors 80 may be distended and shoved into the ground to firmly anchor the device in place.

For purpose of exemplification a particular embodiment of the invention has been shown and described according to the best present understanding thereof. However, it will be apparent to those skilled in the art that various changes and modifications may be made in the construction and arrangement of parts thereof without departing from the true spirit and scope of the invention.

What is claimed as new is as follows:

1. A holder for a fishing rod and reel comprising, in combination, a base embodying a linearly straight elongate body member, a prop-forming arm hingedly mounted at its lower end atop said body member and foldable when not in use against said body member, the other end of said arm being free and bifurcated and providing furcations which, in turn, provide a seat between themselves for temporary reception and retention of a cooperating portion of the fishing rod, said arm being hinged on the body member adjacent to the forward end of the body member, a first bracket detachably and adjustably mounted atop an intermediate portion of said body member and spaced rearwardly from said arm, said bracket being provided with upstanding flanges, a socket member hingedly mounted between said flanges, said socket member being adapted to receive and temporarily hold a cooperating end portion of the handle of the stated fishing rod, said socket member being in alignment with said arm, a second bracket detachably and adjustably mounted atop said body member in a position between said arm and socket member and provided with a vertically adjustable channel-shaped member adapted to receive a stop on the fishing rod, a first pair of hingedly mounted outstanding wings arranged in opposed relationship and hingedly attached to opposite vertical sides of said body member and located at the end of the body member opposite to that which carried the stated arm, the respective lower edge portions of the wings being coplanar with the bottom side of said body member, and a second pair of correspondingly constructed and hingedly mounted stabilizing wings attached to opposite vertical sides of the body member in a position adjacent to the channel-shaped stop receiver, said wings when in use being extended at right angles to said body member and collectively functioning to prevent said body member from rolling or turning in an axial direction once it is placed in position for use.

2. A holder for a fishing rod and reel comprising, in combination, a base embodying a linearly straight elongate body member rectangular in cross-section, an arm hingedly mounted at its lower end on the upper forward portion of said body member for swinging movement in a vertical plane, the upper end of said arm being free and bifurcated to permit the fishing rod to be seated between the furcations and said arm being foldable flat, when not in use, against said upper portion, a socket member adapted to telescopically receive an end portion of the handle of the stated fishing rod, said socket member embodying a bracket adjustably mounted on the intermediate top portion of said body member, a second bracket adjustably mounted on said body member in a position between said socket member and arm and provided with a vertically adjustable channel-shaped member providing a receiver for a stop element on the fishing rod, a first pair of hingedly mounted outstanding wings arranged in opposed relationship and hingedly attached to opposite vertical sides of said body member and located at the end of the body member opposite to that which carries the stated arm, the respective lower edge portions of the wings being coplanar with the bottom side of said body member, and a second pair of correspondingly constructed and hingedly mounted stabilizing wings attached to opposite vertical sides of the body member in a position adjacent to the channel-shaped stop receiver, said wings when in use being extended at right angles to said body member and collectively functioning to prevent said body member from rolling or turning in an axial direction once it is placed in position for use, and a pair of hingedly mounted stakes attached to the fore and aft ends of the bottom side of said body member and foldable against the bottom side when not in use and extended downwardly at right angles when in use.

3. The structure defined in claim 2 and a combination therewith of a linearly straight wire finger having one end hingedly attached to one vertical side of said body member inwardly of the hinged end portion of said arm and having a free end formed with an eye which is releasably connectable with a part of the fishing line reel to prevent the reel from turning, once the over-all rod holder is set in position, to hold the rod in a given position.

References Cited in the file of this patent

UNITED STATES PATENTS

| | | |
|---|---|---|
| 1,891,163 | Kabele | Dec. 13, 1932 |
| 2,301,180 | Hynek | Nov. 10, 1942 |
| 2,317,445 | Davidson et al. | Apr. 17, 1943 |
| 2,449,719 | Rumsey | Sept. 21, 1948 |
| 2,475,193 | Miller | July 5, 1949 |
| 2,561,046 | Brooks | July 17, 1951 |
| 2,645,050 | Golias | July 14, 1953 |
| 2,755,590 | Collins | July 24, 1956 |